United States Patent [19]

Ongchin

[11] 4,286,023

[45] Aug. 25, 1981

[54] ARTICLE OF MANUFACTURE, THE CROSS-LINKED PRODUCT OF A SEMI-CONDUCTIVE COMPOSITION BONDED TO A CROSSLINKED POLYOLEFIN SUBSTRATE

[75] Inventor: Lucio Ongchin, New Fairfield, Conn.

[73] Assignee: Union Carbide Corporation, New York, N.Y.

[21] Appl. No.: 183,069

[22] Filed: Sep. 2, 1980

Related U.S. Application Data

[63] Continuation-in-part of Ser. No. 729,096, Oct. 4, 1976, Pat. No. 4,246,142.

[51] Int. Cl.$^3$ .......................... B32B 27/08; H01B 1/06
[52] U.S. Cl. .................................... 428/516; 428/323; 428/910; 428/520

[58] Field of Search ............... 428/407, 516, 579, 520, 428/910, 327, 328, 323

[56] References Cited

U.S. PATENT DOCUMENTS

| | | | |
|---|---|---|---|
| 3,950,604 | 4/1976 | Denneck | 428/36 X |
| 4,214,030 | 7/1980 | Rakes et al. | 428/516 |

*Primary Examiner*—P. C. Ives
*Attorney, Agent, or Firm*—Reynold J. Finnegan; James C. Arvantes

[57] ABSTRACT

An article of manufacture, the crosslinked product of a semi-conductive composition directly bonded to a crosslinked polyolefin substrate, as for example, an electrical conductor having, as primary insulation, a crosslinked polyolefin and, as semi-conductive shielding, the crosslinked product of a semi-conductive composition.

11 Claims, No Drawings

ARTICLE OF MANUFACTURE, THE CROSS-LINKED PRODUCT OF A SEMI-CONDUCTIVE COMPOSITION BONDED TO A CROSSLINKED POLYOLEFIN SUBSTRATE

This application is a continuation-in-part of my copending application, Ser. No. 729,096, filed Oct. 4, 1976 now U.S. Pat. No. 4,246,142 granted Jan. 20, 1981.

SUMMARY OF THE INVENTION

This invention relates to an article of manufacture wherein a crosslinked product of a semi-conductive composition is directly bonded to a crosslinked polyolefin substrate. More particularly, this invention relates to electrical conductors having, as primary insulation, a crosslinked polyolefin, and directly bonded to the crosslinked polyolefin, as strippable semi-conductive shielding, the crosslinked product of a semi-conductive composition.

BACKGROUND OF THE INVENTION

The construction of insulated, electrical conductors, i.e. wires and cables, designed for medium to high voltage applications is well known in the art and commonly comprises a core conductor of one or more strands of a conducting metal or alloy such as copper, a layer of semi-conductive shielding, a layer of insulation, such as crosslinked polyethylene, and a layer of semi-conductive insulation shielding, overlying the insulation. A plurality of neutral wires which are usually made of copper may be embedded in or wrapped around the layer of semi-conductive insulation shielding, if desired, in the form of a concentric ring around the insulated cable.

The formation of crosslinking bonds between the insulation and shielding makes subsequent separation of the two layers (insulation and semi-conductive shielding) such as occurs in making splices or terminal connections, very difficult and time consuming. Such a strong bond also makes the semi-conductive layer prone to leave carbon residues on the insulation even when it is finally peeled off. Accordingly, a strippable semi-conductive shielding which can be easily and cleanly stripped from the insulation of an insulated conductor is therefore very desirable in this art.

Thus, it is an object of this invention to provide a vulcanizable semi-conductive insulation shielding composition which is particularly useful for providing a strippable shielding for insulated electrical conductors, e.g. wires and cables, that contain, as the primary insulation, a crosslinked polyolefin. Another object of this invention is to provide an article of manufacture comprising the crosslinked product of said vulcanizable semi-conductive insulation shielding composition bonded directly to a crosslinked polyolefin substrate. Yet another object of this invention is to provide an article of manufacture, as defined above, wherein said crosslinked polyolefin is the primary insulation of an insulated electrical conductor, thus providing insulated electrical conductors, e.g. wires and cables comprising, as the primary insulation, a crosslinked polyolefin and as the insulation shield, an easily strippable crosslinked semi-conductive composition. Other objects and advantages of this invention will become readily apparent from the following description and appended claims.

DETAILED DESCRIPTION OF THE INVENTION

The semi-conductive compositions employed in producing the articles of manufacture of this invention consist essentially of (A) an ethylene copolymer selected from the group consisting of an ethylene-alkyl acrylate copolymer containing from about 15 to 45 percent by weight of alkyl acrylate based on the total weight of said copolymer, said alkyl acrylate being selected from the group consisting of the $C_1$ to $C_8$ alkyl esters of acrylic acid and methacrylic acid, and an ethylenevinyl acetate copolymer containing from about 15 to 60 percent by weight vinyl acetate based on the total weight of said copolymer, (B) a butadiene-acrylonitrile copolymer containing from about 10 to about 50 percent by weight of acrylonitrile based on the total weight of said copolymer, (C) conductive carbon black, and (D) a peroxide crosslinking agent; wherein the weight ratio of (A) to (B) in said composition is 1:9 to 9:1; wherein the weight ratio of (C) to the sum weight of (A)+(B) in said composition is 0.1 to 1.5; and wherein (D) is present in an amount of from about 0.2 to about 5 percent by weight preferably about 0.6 to 0.2 percent by weight based on the total weight of the vulcanizable semi-conductive composition.

The vulcanizable ethylene-alkyl acrylate copolymers and/or their methods of preparation are well known in the art. Illustrative ethylene-alkyl acrylate copolymers include the copolymers of ethylene and the $C_1$ to $C_8$ alkyl esters of acrylic acid or methacrylic acid such as methyl acrylate, ethyl acrylate, methyl methacrylate, butyl acrylate, 2-ethylhexyl acrylate and the like, the preferred copolymer being an ethylene-ethyl acrylate copolymer. The ethylene-alkyl acrylate copolymer employed herein should contain from about 15 to 45 percent by weight of alkyl acrylate based on the total weight of said copolymer.

The vulcanizable ethylene-vinyl acetate copolymers and their methods of preparation are also well known in the art. The ethylene-vinyl acetate copolymers employed herein should contain from about 15 to 60 percent by weight of vinyl acetate based on the total weight of said copolymer. A more narrow range is from about 15 to 45 percent by weight of vinyl acetate.

Of course, it is understood that while it is generally preferred to employ only one type of ethylene copolymer in a given composition, the vulcanizable compositions of this invention also include and encompass the use of mixtures of two or more different ethylene-alkyl acrylate copolymers, mixtures of two or more ethylene-vinyl acetate copolymers having different weight percents of vinyl acetate, as well as mixtures of ethylene-alkyl acrylate and ethylene-vinyl acetate copolymers. Moreover, of the two types of ethylene copolymers, ethylene-vinyl acetate is preferred.

The vulcanizable butadiene-acrylonitrile copolymers and methods for their preparation are well known in the art. Such copolymers are commonly referred to in the art as nitrile rubber or simply NBR. The butadiene-acrylonitrile copolymers employed in this invention can contain from about 10 to about 50 percent by weight of acrylonitrile based on the total weight of the copolymer. Of course, if desired, mixtures of such copolymers having different weight percents of acrylonitrile can also be employed.

The use of conductive carbon black in semi-conductive insulation shielding compositions is well known in the art. Any carbon black in any suitable form can be employed including furnace blacks, channel blacks or acetylene blacks, providing they are electrically conductive.

As pointed out above, the weight ratio of (A) ethylene copolymer to (B) butadiene-acrylonitrile copolymer in the vulcanizable semi-conductive insulation shielding compositions of this invention is 1:9 to 9:1, while the weight ratio of conductive carbon black (C) to the sum weight of ethylene copolymer plus butadiene-acrylonitrile copolymer (A+B) in said compositions is 0.1 to 1.5. Thus, for example, based on 100 parts by weight of the sum of ethylene copolymer (A) plus butadiene-acrylonitrile copolymer (B) the weight ratio of ethylene copolymer (A) to butadiene-acrylonitrile copolymer (B) to conductive carbon black (C) ranges from about 10 to about 90 parts by weight of ethylene copolymer (A) to about 90 to about 10 parts by weight of butadiene-acrylonitrile copolymer (B) to about 10 to about 150 parts by weight of conductive carbon black.

Any peroxide crosslinking agent used heretofore in conventional semi-conductive compositions can be employed in this invention. Illustrative examples of such peroxide crosslinking agents include di-α-cumyl peroxide, 2,5-di-methyl-2,5-di(tert-butyl peroxy) hexyne-3, α,α-bis(tertiary-butylperoxy) diisopropylbenzene and the like. While the preferred amount of crosslinking agent employed herein may vary depending upon the particular copolymers employed and other such obvious conditions, in general, it is considered that the amount of crosslinking agent will normally fall within the range of about 0.2 to 5, preferably about 0.6 to 2, percent by weight based on the total weight of the vulcanizable semi-conductive composition.

Whether or not a particular vulcanizable composition will furnish a crosslinked polyolefin insulated electrical conductor with a strippable semi-conductive insulation shielding, may be generally determined by measuring the adhesion between a laminate of crosslinked polyolefin and the crosslinked product of the vulcanizable semi-conductive composition according to ASTM-D-903. While the actual adhesion levels of such layers on a conductor may be slightly higher than that obtained for the corresponding laminate, the above test serves as a useful guideline for predeterming such results.

Of course, it is to be also understood that the vulcanizable semi-conductive insulation shielding compositions of this invention, if desired, can contain other conventional additives in quantities commonly employed in semi-conductive compositions. Examples of such additives include, e.g. age resistors, processing aids, stabilizers, antioxidants, crosslinking boosters and retarders, pigments, fillers, lubricants, ultraviolet stabilizers, antiblock agents and the like. The total amount of such additives normally amounts to no more than about 0.05 to 3 percent by weight based on the total weight of the insulation shielding composition. For instance, it is generally preferred to employ about 0.2 to about 1 percent by weight, based on the total weight of the insulation shielding composition, of an antioxidant such as a substituted diphenylamine or polymerized 1,2-dihydro-2,2,4-trimethylquinoline.

The articles of manufacture of the present invention, as previously described, comprise the crosslinked product of the vulcanizable semi-conductive shielding composition, defined above, bonded directly to a crosslinked polyolefin substrate. Such articles of manufacture may take any shape or form desired. They could be laminated plaques or sheets, which are obviously useful in determining whether or not the crosslinked products would be useful as easily strippable insulation shielding for electrical conductors, as explained above.

More preferably, the crosslinked polyolefins of the articles of manufacture of this invention are the primary insulation of an insulated electrical conductor, the crosslinked products of the vulcanizable compositions being the external semi-conductive shielding for the insulation.

Accordingly, the preferred article of manufacture of this invention may be more specifically described as an insulated electrical conductor, e.g. electrical wire, electrical cable and the like containing as the primary insulation, crosslinked polyolefin and as the external semi-conductive shielding for said insulation, the crosslinked product obtained upon crosslinking the vulcanizable semiconductive insulation shielding composition, which has been previously described.

Of course, it is to be understood that the term "crosslinked polyolefin" as used herein includes and encompasses compositions derived from a crosslinkable polyethylene homopolymer or a crosslinkable ethylene copolymer such as ethylene-propylene rubber or ethylene-propylenediene rubber. Normally, the preferred crosslinked polyolefin insulation is derived from a crosslinkable polyethylene homopolymer. The use of articles of manufacture containing a crosslinked shielding directly bonded to a crosslinked polyolefin substrate and the manner of their preparation are so well known that no further discussion is required to enable one skilled in the art to understand how to produce and use said articles. For instance, the vulcanizable semiconductive shielding composition can be extruded over a crosslinked polyolefin substrate and cured (crosslinked) thereon or it can be extruded over an uncrosslinked polyolefin substrate and both crosslinkable layers simultaneously cured. Moreover, the use of low density polyolefin compositions which, if desired, may contain conventional additives such as fillers, age resistors, talc, clay, calcium carbonate and other processing aids, along with a conventional crosslinking agent is well known in the art as are conventional semi-conductive shielding compositions.

The following examples are illustrative of the present invention and are not to be regarded as limitative. It is to be understood that all parts, percentages and proportions referred to herein and in the appended claims are by weight unless otherwise indicated.

GLOSSARY

EVA = Ethylene-Vinyl Acetate Copolymer
NBR = Butadiene-Acrylonitrile Copolymer

EXAMPLES 1-2,

CONTROL 1

Three vulcanizable semi-conductive compositions containing the following ingredients were prepared, the amounts of all the ingredients in each composition being based on the total weight of each composition.

TABLE I

| Vulcanizable Composition | Example 1 (Weight Percent) | Example 2 (Weight Percent) | Control 1 (Weight Percent) |
| --- | --- | --- | --- |
| EVA* | 48 | 53 | 58 |
| NBR** | 10 | 5 | — |
| Conductive Carbon Black | 40 | 40 | 40 |

TABLE I-continued

| Vulcanizable Composition | Example 1 (Weight Percent) | Example 2 (Weight Percent) | Control 1 (Weight Percent) |
|---|---|---|---|
| Antioxidant+ | 0.4 | 0.4 | 0.4 |
| Peroxide++ | 1.6 | 1.6 | 1.6 |

*Ethylene (78–83%)/Vinyl Acetate (17–22%) Copolymer Melt Index 35–55
**Butadiene (67%)/Acrylonitrile (33%) Copolymer, (B. F. Goodrich's Hycar 1052)
+Polymerized 1,2-dihydro-2,2,4-trimethylquinoline
++Di-α-cumyl peroxide Each composition was formed in the same manner by uniformly admixing the components thereof in a Banbury mixer. About 1350 grams of each composition were prepared.

In order to evaluate the strippability properties of these compositions as semi-conductive insulation shieldings, plaques were formed from each composition and the plaques used to prepare laminates.

The polyethylene plaques, in each instance, were prepared from a crosslinkable polyethylene homopolymer composition consisting of polyethylene (98%) di-α-cumyl peroxide (2%) and bis(2-methyl-5-tert-butyl-4-hydroxyphenyl) sulfide (0.2%), an antioxidant.

The polyethylene/semi-conductive laminates were made by first molding polyethylene plaques and crosslinking them. The vulcanizable semi-conductive plaques were separately molded, but not crosslinked. The laminates were made by pressing and heating each vulcanizable semi-conductive plaque together with one of the crosslinked polyethylene plaques, during which time the vulcanizable semi-conductive composition became crosslinked. Each laminate was prepared in the same manner and under the same conditions.

The adhesion between the test laminates was then determined by measuring the peel strength between the two plaques of the laminate in terms of pounds per inch strip, i.e. the force in pounds per inch strip necessary to peel or strip the crosslinked semi-conductive shielding layer from the crosslinked polyethylene insulation layer. Each adhesion test was performed in the same manner and under the same conditions. The test results for each laminate (the results, representing the average value for testing five such laminates for each vulcanizable semi-conductive composition) are given in Table II below.

In addition other various physical property tests were conducted on a neat crosslinked molded plaque made from each vulcanizable semi-conductive composition and the results of these tests are also given in Table II below.

The above data demonstrates that the vulcanizable semi-conductive compositions of this invention will provide good strippable semi-conductive insulation shieldings for insulated electrical conductors having as the primary insulation a crosslinked polyolefin. Note that the vulcanizable semi-conductive compositions of this invention which contained a butadiene-acrylonitrile copolymer in their crosslinked form (Examples 1 and 2) were more strippable from crosslinked polyethylene than a corresponding crosslinked ethylene-vinyl acetate semi-conductive composition that did not contain any butadiene-acrylonitrile copolymer (Control 1). Moreover, it is considered that the strippability of the crosslinked vulcanizable semiconductive compositions of this invention from crosslinked polyethylene can be improved over that shown in Examples 1 and 2 by using an ethylene-vinyl acetate copolymer having a higher vinyl acetate content.

Various modifications and variations of this invention will be obvious to a worker skilled in the art and it is to be understood that such modifications and variations are to be included within the purview of this application and the spirit and scope of the appended claims.

What is claimed is:

1. An article of manufacture comprising the crosslinked product of a vulcanizable semi-conductive composition consisting essentially of (A) an ethylene copolymer selected from the group consisting of an ethylene-alkyl acrylate copolymer containing from about 15 to 45 percent by weight of alkyl acrylate based on the total weight of said copolymer, said alkyl acrylate being selected from the group consisting of the $C_1$ to $C_8$ alkyl esters of acrylic acid and methacrylic acid, and an ethylene-vinyl acetate copolymer containing from about 15 to 45 percent by weight of vinyl acetate based on the total weight of said copolymer, (B) a butadiene-acrylonitrile copolymer containing from about 10 to about 50 percent by weight of acrylonitrile based on the total weight of said copolymer, (C) conductive carbon black, and (D) a peroxide crosslinking agent, wherein the weight ratio of (A) to (B) in said composition is 1:9 to 9:1, wherein the weight ratio of (C) to the sum weight of (A)+(B) in said composition is 0.1 to 1.5 and wherein (D) is present in an amount of from about 0.2 to about 5 percent by weight based on the total weight of the composition, said crosslinked product being directly bonded to a crosslinked polyolefin substrate.

2. An article of manufacture comprising the crosslinked product of a vulcanizable semi-conductive composition consisting essentially of (A) and ethylene-alkyl acrylate copolymer containing from about 15 to 45

TABLE II

| Physical Properties | Example 1 | Example 2 | Control 1 |
|---|---|---|---|
| Laminate Adhesion Pounds per inch strip | 17.5 | 17.5 | 18.2 |
| Tensile Strength, psi - ASTM-D-412* | 2220 | 2200 | 2140 |
| Elongation, percent - ASTM-D-412* | 160 | 156 | 143 |
| Tensile Strength, psi ASTM-D-412** | 2570 | 2180 | 2130 |
| Elongation, percent - ASTM-D-412** | 43 | 103 | 146 |
| Brittleness at −° C. - ASTM-D-746 | 3 No Good/12 Good | 2 No Good/13 Good | 3 No Good/12 Good |
| Volume Resistivity - ASTM-D-991*** | | | |
| ohm-cm, 23° C. | 6 | 8 | 8 |
| ohm-cm, 40° C. | 7 | 9 | 11 |
| ohm-cm, 60° C. | 10 | 17 | 36 |
| ohm-cm, 80° C. | 22 | 46 | 119 |
| ohm-cm, 90° C. | 25 | 49 | 124 |

*Average of 3 runs
**Average of 3 runs after the crosslinked semi-conductive plaque had been aged at 130° C. for 1 week
***Average of 2 runs percent by weight of alkyl acrylate based on the total weight of said copolymer, said alkyl acrylate being selected from the group consisting of the $C_1$ to $C_8$ alkyl esters of acrylic acid and methacrylic acid, (B) a butadiene-acrylonitrile copolymer containing from about 10 to about 50 percent by weight of acrylonitrile based on the total weight of said copolymer, (C) conductive carbon black, and (D) a peroxide crosslinking agent, wherein the weight ratio of (A) to (B) in said composition is 1:9 to 9:1, wherein the weight ratio of (C) to the sum weight of (A)+(B) in said composition is 0.1 to 1.5 and wherein (D) is present in an amount of from about 0.2 to about 5 percent by weight based on the total weight of the composition, said crosslinked product being directly bonded to a crosslinked polyolefin substrate.

3. An article of manufacture comprising the crosslinked product of a vulcanizable semi-conductive composition consisting essentially of (A) an ethylene-vinyl acetate copolymer containing from about 15 to 45 percent by weight of vinyl acetate based on the total weight of said copolymer, (B) a butadiene-acrylonitrile copolymer containing from about 10 to about 50 percent by weight of acrylonitrile based on the total weight of said copolymer, (C) conductive carbon black, and (D) a peroxide crosslinking agent, wherein the weight ratio of (A) to (B) in said composition is 1:9 to 9:1, wherein the weight ratio of (C) to the sum weight of (A)+(B) in said composition is 0.1 to 1.5 and wherein (D) is present in an amount of from about 0.2 to about 5 percent by weight based on the total weight of the composition, said crosslinked product being directly bonded to a crosslinked polyolefin substrate.

4. An article of manufacture as defined in claim 3 wherein (D) of the said vulcanizable semi-conductive composition is present in an amount of from about 0.6 to about 2 percent by weight based on the total weight of the composition.

5. An article of manufacture as defined in claim 3 wherein the said vulcanizable semi-conductive material contains about 0.2 to about 1 percent by weight of an antioxidant based on the total weight of the composition.

6. An article of manufacture as defined in claim 3 wherein the peroxide crosslinking agent is di-$\alpha$-cumyl peroxide.

7. An article of manufacture as defined in claim 2 wherein the polyolefin of the crosslinked polyolefin substrate is polyethylene.

8. An article of manufacture as defined in claim 3 wherein the polyolefin of the crosslinked polyolefin substrate is polyethylene.

9. An article of manufacture as defined in claim 1 wherein the said crosslinked polyolefin is the primary insulation about an electrical conductor and the said crosslinked product is the semi-conductive shielding for said insulation.

10. An article of manufacture as defined in claim 3 wherein the said crosslinked polyolefin is the primary insulation about an electrical conductor and said crosslinked product is the semi-conductive shielding for said insulation.

11. A process of producing an article as defined in claim 1 wherein the said vulcanizable composition and said polyolefin substrate are simultaneously crosslinked.

* * * * *